United States Patent [19]

Langstein et al.

[11] Patent Number: 5,214,115

[45] Date of Patent: May 25, 1993

[54] UNCROSSLINKED COPOLYMERS CONTAINING REACTIVE DOUBLE BONDS OF FLUORINE MONOMERS AND UNCONJUGATED DIENES AND A PROCESS FOR THEIR PRODUCTION

[75] Inventors: Gerhard Langstein, Kuerten-Biesfeld; Ralf Krüger; Karl-Erwin Piejko, both of Bergisch Gladbach, all of Fed. Rep. of Germany

[73] Assignee: Bayer Aktiengesellschaft, Leverkusen, Fed. Rep. of Germany

[21] Appl. No.: 874,931

[22] Filed: Apr. 28, 1992

[30] Foreign Application Priority Data

May 4, 1991 [DE] Fed. Rep. of Germany ....... 4114598

[51] Int. Cl.$^5$ ............................................ C08F 16/24
[52] U.S. Cl. .................................. 526/247; 526/255; 526/249
[58] Field of Search ................ 526/207, 247, 255, 249

[56] References Cited

U.S. PATENT DOCUMENTS

| | | |
|---|---|---|
| 2,968,649 | 1/1961 | Pallthorp et al. . |
| 3,051,677 | 8/1962 | Rexford . |
| 3,053,818 | 9/1962 | Honn et al. . |
| 3,331,823 | 7/1967 | Sianesi et al. . |
| 3,335,106 | 8/1967 | Sianesi et al. . |
| 3,351,619 | 11/1967 | Warnell et al. . |
| 3,851,018 | 11/1974 | Kelly et al. . |
| 4,035,565 | 7/1977 | Apotheker et al. . |
| 4,214,060 | 7/1980 | Apotheker et al. . |
| 4,243,770 | 1/1981 | Tatemoto et al. . |
| 4,748,223 | 5/1988 | Haruyoshi et al. . |
| 4,831,085 | 5/1989 | Okabe et al. . |

FOREIGN PATENT DOCUMENTS 0302513 2/1989 European Pat. Off. .

OTHER PUBLICATIONS

Rubber Chemistry and Technology, vol. 55, pp. 1004–1018, "Curing of Fluoroelastomers by Peroxides".

*Primary Examiner*—Joseph L. Schofer
*Assistant Examiner*—N. Sarofim
*Attorney, Agent, or Firm*—Sprung Horn Kramer & Woods

[57] ABSTRACT

An uncrosslinked copolymer of comonomers (a), (b) and (c) and containing reactive double bonds, the comonomers based on the total mols of (a), (b) and (c) comprising (a) 45 to 99.9 mol-% of at least one ethylene containing 1 to 4 fluorine atoms, (b) 0 to 54.9 mol-% of at least one comonomer selected from the group consisting of (b1) a linear or branched $C_{3-8}$ alkene containing at least one fluorine atom, (b2) an alkyl vinyl ether containing at least one fluorine atom, (b3) an open-chain or cyclic $C_{3-6}$ ketone containing fluorinated $\alpha,\alpha'$-positions and (b4) non-fluorinated $C_{2-4}$ alkene, $C_{3-6}$ alkyl vinyl ether or $C_{4-6}$ vinyl ester, and (c) 0.1 to 5 mol-% of at least one unconjugated diene. They are produced by radical polymerization. Because of the absence of bromine and/or iodine, during subsequent peroxidic cross-linking no toxic alkyl bromide and/or iodide is released.

6 Claims, No Drawings

UNCROSSLINKED COPOLYMERS CONTAINING REACTIVE DOUBLE BONDS OF FLUORINE MONOMERS AND UNCONJUGATED DIENES AND A PROCESS FOR THEIR PRODUCTION

This invention relates to fluorine copolymers containing reactive unsaturated side groups and to a process for their production.

BACKGROUND OF THE INVENTION

Fluorine polymers are always used for applications which require special properties, such as low surface tension or high resistance to chemicals or which impose extreme requirements on ageing resistance. For many applications, the fluorine polymers are crosslinked during or after molding, as for example where they are used in the rubber field. In the case of unmodified fluorine elastomers, i.e. elastomers which do not contain any special reactive sites, these crosslinking reactions require drastic conditions so that crosslinking is difficult to control and damage can be caused to the fluorine polymer. To avoid this, reactive sites, so-called cure sites, are introduced into the polymer chains so that the polymers can be selectively crosslinked under milder conditions. The cure sites in question are, for example, bromine or iodine substituents which are introduced into the fluorine polymer either by copolymerizing bromine- and/or iodine-containing vinyl compounds in small quantities with the fluorine monomers (U.S. Pat. No. 3,351,619; U.S. Pat. No. 4,035,565; U.S. Pat. No. 4,214,060; DE-OS 3 715 210) or by carrying out the polymerization in the presence of saturated compounds containing iodine or bromine and iodide (DE-OS 2 815 187; DE-OS 3 710 818). Bromine- and/or iodine-modified fluorine polymers such as these can be radically crosslinked, for example by peroxidic compounds, in the presence of a co-crosslinking agent. Triallyl cyanurate or triallyl isocyanurate may be used as the co-crosslinker (Rubber Chem. Technol. 55 (1982), 1004).

Compared with bisphenol-crosslinked types for example, these peroxide-crosslinked fluorine rubbers show considerably improved resistance to bases, nucleophiles and oxidation (Kautschuk und Gummi, Kunststoffe 38 (1985), 471).

However, the bromine- or iodine-containing fluorine polymers have the disadvantage that low molecular weight alkyl bromides or iodides can be formed during the radical crosslinking reaction, evaporating during the crosslinking reaction and thus impairing the processing and performance properties.

Accordingly, there was a need for fluorine polymers which can be crosslinked radically, for example by peroxides, under mild conditions and which do not have any of the weaknesses mentioned above. Basically, these desirable properties could be achieved by incorporation of functional monomers, i.e. monomers containing reactive double bonds, if controlled incorporation leaving the double bonds intact were possible.

However, if fluorine monomers are polymerized in accordance with the prior art in the presence of polyunsaturated monomers, such as perfluorodivinyl ether (U.S. Pat. No. 3,851,018), the polymers are crosslinked to a considerable extent during the actual copolymerization, which is undesirable for many applications.

In addition to a number of monomers, non-fluorinated conjugated dienes, such as butadiene, isoprene or chloroprene, are mentioned as potential comonomers in EP 360 575 A2. However, these monomers either inhibit the polymerization of the fluorine monomers or lead to crosslinked products, so that these monomers are also unsuitable for the production of the desired uncrosslinked fluorine polymers containing lateral double bonds.

It has now been found that fluorine-containing vinyl compounds of the type mentioned below and unconjugated dienes of the type mentioned further below can be copolymerized in such a way that substantially uncrosslinked copolymers are formed which contain reactive double bonds as side groups and which can be radically crosslinked (vulcanized) under mild conditions. Unconjugated dienes are understood by the expert to be dienes in which the two C—C double bonds are separated by at least one $sp^3$-hybridized C atom.

SUMMARY OF THE INVENTION

The present invention relates to uncrosslinked copolymers containing reactive double bonds of a) 45 to 99.9 mol-%, based on the total mols of all comonomers, of one or more ethylenes containing 1 to 4 fluorine atoms, b) 0 to 54.9 mol-%, based on the mols of all the comonomers, of one or more comonomers from the group consisting of b1) linear or branched $C_{3-8}$ alkenes containing at least one fluorine atom, b2) alkyl vinyl ethers containing at least one fluorine atom, b3) open-chain or cyclic $C_{3-6}$ ketones containing fluorinated $\alpha,\alpha'$-positions and b4) non-fluorinated $C_{2-4}$ alkenes, $C_{3-6}$ alkyl vinyl ethers and/or $C_{4-6}$ vinyl esters, and c) 0.1 to 5 mol-%, preferably 0.2 to 2.5 mol-% and, more preferably, 0.3 to 1.5 mol-%, based on the mols of all the comonomers, of one or more comonomers from the group of unconjugated dienes.

The present invention also relates to a process for the production of copolymers of the type described above, characterized in that the comonomers mentioned above are radically copolymerized in solution, suspension or emulsion under elevated pressure and at temperatures of $-15°$ C. to $+120°$ C., preferably at temperatures of $20°$ to $90°$ C. and, more preferably, at temperatures of $30°$ to $80°$ C.

The copolymers according to the invention are substantially uncrosslinked. According to the invention, this means that they have gel contents of $<10\%$ and preferably $<4\%$. In a particularly preferred embodiment, the gel content is below the detection limit, which means that the fluorine polymers according to the invention are completely soluble in those liquids in which they are soluble at all. The gel contents are determined in accordance with M. Hoffmann et al., Polymeranalytik I und II, Georg Thieme Verlag, Stuttgart 1977. The gel contents are determined in solvents in which the corresponding fluorine polymers without incorporated unconjugated dienes are completely soluble. The copolymers according to the invention have average molecular weights of $10^3$ to $10^7$ g/mol and preferably in the range from $10^3$ to $2.10^6$ g/mol. They are substantially linear in structure.

PREFERRED EMBODIMENTS

Ethylenes containing 1 to 4 fluorine atoms are suitable as component a) of the copolymers according to the invention. Those bonds of the two carbon atoms which are not occupied by fluorine can bear hydrogen or chlorine or both. Fluorinated ethylenes such as these are, for example vinylidene fluoride, tetrafluoroethylene, chlorotrifluoroethylene and vinyl fluoride. These fluorinated ethylenes may be used both individually and in combination with one another. The fluorinated ethylenes mentioned by way of example above are preferably used as components a).

One or more comonomers from the group consisting of b1), b2), b3) and b4) are suitable as component b). Components of group b1) are linear or branched $C_{3-8}$ alkenes containing at least one fluorine atom. Examples of such comonomers of group b1) are hexafluoropropene, 2-hydropentafluoropropene, 3,3,3-trifluoropropene, mono- or polyfluorinated butenes, such as hexafluoroisobutylene, pentenes, hexenes or octenes. In addition to at least one fluorine atom, these comonomers may also contain chlorine atoms. The comonomers of group b1) are preferably $C_{3-6}$ alkenes containing at least one fluorine atom and, more preferably, $C_{3-4}$ alkenes containing at least one fluorine atom.

Comonomers of group b2) are alkyl vinyl ethers containing at least one fluorine atom, for example perfluoropropyl perfluorovinyl ether, perfluoromethyl perfluorovinyl ether, perfluoropropyl vinyl ether, n-butyl perfluorovinyl ether, and the like.

Comonomers of b3) are open-chain and cyclic $C_{3-6}$ ketones containing fluorinated $\alpha,\alpha'$-positions which are copolymerized through the C=O bond, such as hexafluoroacetone, perfluorocyclopentanone, and the like.

Comonomers of group b4) are non-fluorinated $CC_{2-4}$ alkenes, such as ethylene, propene, 1-butene, isobutylene, $C_{3-6}$ alkyl vinyl ethers, such as methyl vinyl ether, ethyl vinyl ether and the like, and $C_{4-6}$ vinyl esters, such as vinyl acetate, vinyl propionate and others.

Unconjugated dienes or mixtures of several unconjugated dienes are used as component c). Dienes containing at least one terminal double are preferred. Dienes such as these correspond to the following formula

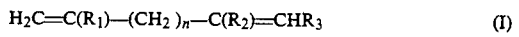

in which n=1 to 14 and $R_1$ to $R_3$ may be hydrogen, alkyl, cycloalkyl or aryl.

The alkyl group contains 1 to 6 carbon atoms, such as methyl, ethyl, butyl, hexyl; the cycloalkyl group contains 3 to 6 carbon atoms, such as cyclopropyl, cyclopentyl, cyclohexyl; the aryl group contains 6 to 9 carbon atoms, such as phenyl, tolyl. Unconjugated dienes containing two terminal double bonds, i.e. in which $R_1$ and $R_3$ are hydrogen, are preferred.

1,4-Pentadiene, 1,5-hexadiene and 1,7-octadiene are particularly preferred.

For the preferred case where vinylidene fluoride, tetrafluoroethylene, chlorotrifluoroethylene and/or vinyl fluoride are used as component a), other fluorine-containing ethylenes from group a) besides the fluorine-containing $C_{3-8}$ alkenes of component b1) may be comonomers.

Basically, components a), b) and c) are used in the quantities indicated above. Components a) and c) are compulsory components of the copolymers according to the invention. Their percentage contents add up to 100 mol-%. However, component a) may be partly replaced by one or more compounds of component b). In this case, the subgroups of b), namely b1), b2), b3) and b4), have equal priority and may be represented in the form of one compound or in the form of a mixture of several compounds from these subgroups as comonomers.

The quantity of component c) is from 0.1 to 5 mol-%, preferably from 0.2 to 2.5 mol-% and, more preferably, from 0.3 to 1.5 mol-%. Accordingly, the quantity of component a) or of the sum of components a) and b) including the subgroups b1), b2), b3) and/or b4) is from 95 to 99.9 mol-%, preferably from 97.5 to 99.8 mol-% and, more preferably, from 98.5 to 99.7 mol-%. Within the last-mentioned quantities, the quantity of component a) is at least 45 mol-%, preferably at least 48 mol-% and, more preferably, at least 50 mol-%, based on the total mols of all the comonomers (the same also applies to other figures relating to the copolymers according to the invention). The comonomers of group b) are present in a quantity of 0 to 54.9 mol-%, preferably in a quantity of up to 51.9 mol-% and, more preferably, in a quantity of up to 49.9 mol-%, the non-fluorine-containing unsaturated compounds of subgroup b4) preferably being used in a maximum content of up to 25 mol-%. The lower limit of 0 mol-% indicates that the comonomers of component b) are optional comonomers of the copolymers according to the invention and may even be omitted altogether. However, it has proved to be of advantage for the copolymers according to the invention always to contain certain amounts of component b) where they are used as rubbers. The amounts in question for the use of the copolymers as rubbers are between 5 and 45 mol-% and preferably between 10 and 40 mol-%, based on the total mols of all the comonomers, which may be distributed between various subgroups of component b) and may even include more than one compound. In a preferred embodiment, components from the subgroups b1), b2) and/or b4) are used as components b). The following are mentioned as combinations of components a) and b) for the use of the copolymers as rubbers: vinylidene fluoride/hexafluoropropene, vinylidene fluoride/tetrafluoroethylene/hexafluoropropene, vinylidene fluoride/tetrafluoroethylene/perfluoroalkyl perfluorovinyl ether, tetrafluoroethylene/vinylidene fluoride/hexafluoropropene/pentafluoropropene, tetrafluoroethylene/vinylidene fluoride/hexafluoropropene/perfluoroalkyl perfluorovinyl ether, tetrafluoroethylene/hexafluoropropene/hexafluoroisobutylene, vinylidene fluoride/chlorotrifluoroethylene/hexafluoropropene, and the like.

In addition to the copolymers just described, in which comonomers of group b) are present in less than an equivalent quantity in relation to those of group a), other important copolymers are those in which the comonomers of group a) and b) are present in substantially the same molar quantities.

The polymerization reaction may be controlled in such a way that most of the polymer chain contains monomers a) to b) in strict alternation plus the unconjugated dienes of group c) at larger intervals commensurate with their total quantity.

The composition of the copolymers according to the invention containing substantially equal molar quantities of comonomers of groups a) and b) comprises 45 to 55 mol-% from group a), 44.9 to 54.9 mol-% from group b) and 0.1 to 5 mol-% from group c), preferably 47.9 to 51.9 mol-% from group a), 47.9 to 51.9 mol-% from b) and 0.2 to 2.5 mol-% from group c). An important example of a two-component combination of comonomers which are copolymerized in substantially equal molar quantities is the combination of tetrafluoroethylene and propene to which the unconjugated diene from group c) is then added.

The process parameters known for the copolymerization of fluorine-containing monomers may be used for the production of the copolymers according to the invention. Copolymerization may be carried out in solution, suspension or emulsion (U.S. Pat. No. 2,968,649; U.S. Pat. No. 3,051,677; U.S. Pat. No. 3,053,818; U.S. Pat. No. 3,331,823; U.S. Pat. No. 3,335,106 with examples of suitable reaction media and general reaction conditions). Basically, known compounds suitable for the particular reaction medium are used to initiate the radical copolymerization. Thus, organic oil-soluble peroxides which may even be fluorinated, such as benzoyl peroxide, trifluoroacetyl peroxide, or organic soluble azo compounds, such as azo-bis-isobutyronitrile, are used for solution and suspension polymerization. Water-soluble inorganic per compounds, such as persulfates, perborates, percarbonates, etc., generally in the form of their sodium or ammonium salts, are used as initiators for emulsion polymerization which is preferably used for the production of the copolymers according to the invention.

Depending on the polymerization temperature and the decomposition constant of the initiator, decomposition accelerators, generally reducing agents, may have to be additionally used for polymerization in cases where low temperatures are applied. Suitable decomposition accelerators are sulfur compounds, such as for example sodium sulfite, sodium pyrosulfite or Rongalit C (sodium formamidine sulfinic acid), and also organic reducing agents, such as ascorbic acid, metal salts, such as iron(II) or cobalt(II) salts, organometallic compounds, etc.

The reaction temperatures for the copolymerization are in the range from $-15°$ to $+120°$ C., preferably in the range from 20° to 90° C. and, more preferably, in the range from 30° to 80° C. The last of these three temperature ranges establishes particularly favorable conditions in regard to the volume/time yield and the chemical uniformity of the copolymers.

If necessary, chain transfer agents, such as methanol, isopropanol, isopentane, ethyl acetate, diethyl malonate and carbon tetrachloride, may be used to adjust the molecular weight of the polymers formed.

Another characteristic of the process according to the invention is that the copolymerization is carried out under an elevated pressure. This pressure should be least 5 bar, but need not exceed 100 bar.

The preferred pressure range for the process according to the invention is from 5 to 65 bar.

The copolymers according to the invention may be produced in batches, although they are preferably produced semicontinuously or continuously.

In one advantageous variant of the process according to the invention, the stationary concentration of free monomer in component c) is kept low. This is achieved by initially introducing 0.02 to 1.5 mol-% diene(s), based on the total mols of comonomers to be reacted, optionally together with other comonomers of components a) and b), either in batches or semicontinuously and uniformly adding the rest of component c) in accordance with the advance of the copolymerization. The rest of component c) is of course added at the same time as the remainders of components a) and b). The above-mentioned range of 0.02 to 1.5 mol-% diene(s) represents a part of around 5 to 30 relative-% of component c), based on the total quantity of 0.1 to 5 mol-% of component c) to be used. The initial introduction and subsequent addition of component c) may be made in the form of the pure dienes or as part of an aqueous solution containing the emulsifier or even in the form of a solution in solvents which do not affect the radical copolymerization. Solvents such as these are, for example, t-butanol and methyl acetate.

The copolymers according to the invention may be radical-crosslinked. The radical crosslinking may be initiated by high-energy radiation or thermally in the presence of radical initiators. Preferred radical initiators are peroxides which have decomposition half times at temperatures above 100° C. of at least 5 minutes. Initiators such as these are, for example, dibenzoyl peroxide, bis-(tert.-butylperoxyisopropyl)-benzene or 2,5-bis-(tert.-butylperoxy)-2,5-dimethyl hexane which are used in the usual quantities. The peroxides may be incorporated in the uncrosslinked copolymer according to the invention by any of the methods normally used for compounding. Thus, the copolymers according to the invention may be processed on rolls or in a kneader to form the above-mentioned compounds which are then vulcanized at 120° to 180° C. to form elastomers or cured to form dimensionally stable moldings. Solution or melt processing is also possible, in which case drying and crosslinking may be carried out in a single step after processing where mouldings are to be produced in the form of films, fibers or compact structures. One or more compounds from the large number of known compounds containing several double bonds, such as for example triallyl cyanurate, triallyl isocyanurate, trimethallyl isocyanurate, tetramethyl tetravinyl cyclotetrasiloxane, m-phenylene-bis-maleic imide and others, may be used as co-crosslinkers.

The copolymers according to the invention are distinguished above all by good processing properties, such as miscibility with fillers, crosslinking aids, pigments, etc., so that it is possible to produce mixtures or blends of high homogeneity which may then be rapidly crosslinked under moderate conditions to form heat-stable vulcanizates or cured mouldings. The degree of crosslinking and hence the physicomechanical properties of the crosslinked material may be specifically varied within wide limits.

A particular advantage of the copolymers according to the invention is that they contain no bromine and/or iodine so that no toxic alkyl bromide and/or iodide can be released during the peroxidic crosslinking reaction.

EXAMPLES

Example 1

3,000 ml deionized water were introduced into a 6.0 liter autoclave. 20 g lithium perfluorooctyl sulfonate and 13 g ammonium persulfate were then dissolved therein. The closed autoclave was then placed three times under a nitrogen pressure of 10 bar and subsequently vented to normal pressure. 1,100 g hexafluoropropene and 200 g vinylidene fluoride were then introduced into the autoclave and the reaction mixture was subsequently heated to 70° C. After reaching the temperature of 70° C., 100 ml of a solution of 18.9 g 1,5-hexadiene in 72.7 ml t-butanol were pumped in over a period of 5 hours, after which the reaction mixture was stirred for 6 hours at 70° C. During this time, the pressure fell from 31 bar to 21 bar. After cooling, residual monomers were removed by stirring for 3 hours and the aqueous emulsion (pH 2.6) was poured into 1,500 ml of a 4% aqueous magnesium sulfate solution to coagulate the product. The product was washed with water and dried. The yield amounted to 375 g of a rubber-like polymer containing hexafluoropropene, vinylidene fluoride and 1,5-hexadiene. The molar ratio of hexafluoropropene to vinylidene fluoride was determined by 19 F nulcear resonance spectroscopy and was 38:62. The percentage content of 1,5-hexadiene bound in the copolymer which still shows free double bonds was determined by iodometry (iodine value according to HANUS). The iodine value is 0.5 g $I_2$/100 g polymer so that the copolymer contains 0.2 mol-% 1,5-hexadiene. The iodine values of comparable rubbers (i.e. same composition VDF/HFP) with no diene were below 0.1 g $I_2$/100 g polymer. The copolymer is completely soluble in 3,5-bis-(trifluoromethyl)-phenol(BTFMP) and has an limiting viscosity number of 0.3 dl/g (BTFMP, 120° C.).

Example 2

129 ml deionized water were introduced into a 0.3 liter autoclave. 1.67 g sodium perfluorooctanoate and 0.66 g potassium peroxydisulfate were then dissolved therein. The resulting solution was adjusted to a pH value of 10 with sodium hydroxide. 0.7 g 1,4-hexadiene was then dispersed therein. The closed autoclave was then placed three times under a nitrogen pressure of 10 bar and subsequently vented to normal pressure. 47 g hexafluoropropene and 13 g vinylidene fluoride were introduced into the autoclave, after which the reaction mixture was heated with stirring to 70° C. After a total reaction time of 6 hours, in which the reaction pressure fell from 31 bar to 18 bar, the autoclave was cooled to room temperature and unreacted monomer was evaporated off. The aqueous emulsion thus obtained was poured into 150 ml of a 4% aqueous magnesium sulfate solution in order to coagulate the product. The product was washed with water and then dried. 16.8 g of a rubber-like polymer containing hexafluoropropene, vinylidene fluoride and 1,4-hexadiene were isolated. The molar composition as determined by the method described in Example 1 was 29.9:69.85:0.25 (hexafluoropropene/vinylidene fluoride/1,4-hexadiene). The copolymer is completely soluble in BTFMP (120° C.). The limiting viscosity number is 0.1 dl/g (BTFMP, 120° C.).

Example 3

3,000 ml deionized water were introduced into a 6 liter autoclave. 20.0 g lithium perfluorooctane sulfonate and 13.0 g ammonium peroxydisulfate were dissolved therein. 8.4 g 1,5-hexadiene were then dispersed in the resulting solution. The closed autoclave was placed three times under a nitrogen pressure of 10 bar and subsequently vented to normal pressure. 650 g vinylidene fluoride were introduced into the autoclave and the reaction mixture was heated with stirring to 70° C. After that temperature had been reached, 65 ml of a solution of 18.7 g 1,5-hexadiene dissolved in 72.68 ml t-butanol were pumped in over a period of 6.5 hours. The pressure fell from 37 bar to 7 bar. The contents of the autoclave were cooled and unreacted vinylidene fluoride was evaporated off. The product was precipitated as described in Example 1. 362.2 g polymer were obtained. 98% of the copolymer was soluble in dimethyl formamide; gel content 1.8%. The limiting viscosity number (BTFMP, 120° C.) is 0.6 dl/g. The copolymer contains 2 mol-% 1,5-hexadiene in addition to 98 mol-% vinylidene fluoride.

Example 4

Vinylidene fluoride and hexafluoropropene were pumped into a continuously operated stirred 0.7 l reactor at respective rates of 60 g/h and 105 g/h. At the same time, a mixture of 4.4 g lithium perfluorooctane sulfonate, 100 ml tert. butanol, 2.15 g 1,5-hexadiene and 1,400 ml deionized water and a solution of 5.16 g ammonium persulfate and 0.87 g disodium hydrogen phosphate in 1,400 ml deionized water were each pumped in at a rate of 225 ml/h. The pressure in the reactor was kept at 45 bar by a pressure retaining valve. The reaction temperature was 90° C. The conversion was 67.5%. The products were isolated as described in Examples 1 to 3. The molar composition as determined by the method described in Example 1 was 29.3:70.1:0.6 (hexafluoropropene/vinylidene fluoride/1,5-hexadiene). The limiting viscosity number (BTFMP, 120° C.) was 0.6 dl/g and the gel content was 2%.

A mixture of 100 parts by weight of the copolymer thus obtained, 3 parts by weight zinc white (KADOX 911), 30 parts by weight carbon black MT Black N 990, 3 parts by weight Percalink 301-50 (triallyl isocyanurate, 50% in inactive fillers) and 7 parts by weight Perkadox 14/40 [bis-(t-butylperoxyisopropyl)-benzene, 40% in inactive fillers] was prepared, pressure-vulcanized for 30 minutes at 180° C. and then post-cured for 24 hours at 200° C. in a recirculating air oven.

In contrast to the starting polymer, the vulcanized product is no longer soluble in BTFMP at 120° C. (gel content: >95%). A similarly prepared mixture containing a vinylidene fluoride/hexafluoropropene copolymer but no diene comonomer cannot be crosslinked under the described conditions.

Example 5

150 ml deionized water were introduced into a 0.3 liter autoclave. 1.1 g lithium perfuorooctane sulfonate and 0.8 g potassium peroxydisulfate were dissolved in the resulting solution. The solution was then adjusted to a pH value of about 10 with sodium hydroxide. 1.31 g 1,5-hexadiene were then dispersed therein. The closed autoclave was then placed three times under a nitrogen pressure of 10 bar and subsequently vented to normal pressure. 60 g chlorotrifluoroethylene were then introduced into the autoclave and the reaction mixture was heated with stirring to 70° C. After a total reaction time of 8 hours at 70° C., in which the reaction pressure fell from 22.4 bar to 17.8 bar, the contents of the autoclave were cooled and the unreacted chlorotrifluoroethylene was evaporated off. 44.4 g of a copolymer were isolated by the same method as in Example 1.

The following copolymer composition was determined by analysis of the chlorine and hydrogen contents:

Chlorotrifluoroethylene/1,5-hexadiene=95:5 (molar ratio)

The copolymer is insoluble in dimethyl formamide; a similarly prepared polychlorotrifluoroethylene containing no 1,5-hexadiene is also insoluble in dimethyl formamide. The copolymer melts at 199° to 200° C. The melting point of the polychlorotrifluoroethylene prepared similarly without 1,5-hexadiene is 210° to 212° C.

It will be understood that the specification and examples are illustrative but not limitative of the present invention and that other embodiments within the spirit and scope of the invention will suggest themselves to those skilled in the art.

We claim:

1. An uncrosslinked copolymer of comonomers (a), (b) and (c) and containing reactive double bonds, the comonomers based on the total mols of (a), (b) and (c) comprising
   (a) 45 to 99.9 mol-% of at least one ethylene containing 1 to 4 fluorine atoms,
   (b) 0 to 54.9 mol-% of at least one comonomer selected from the group consisting of
      (b1) a linear or branched $C_{3-8}$ alkene containing at least one fluorine atom,
      (b2) an alkyl vinyl ether containing at least one fluorine atom,
      (b3) an open-chain or cyclic $C_{3-6}$ ketone containing fluorinated $\alpha$, $\alpha'$-positions and
      (b4) non-fluorinated $C_{2-4}$ alkene, $C_{3-6}$ alkyl vinyl ether or $C_{4-6}$ vinyl ester, and
   (c) 0.1 to 5 mol-% of at least one unconjugated diene of the formula

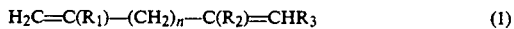
   $$H_2C=C(R_1)-(CH_2)_n-C(R_2)=CHR_3 \qquad (1)$$

in which $n=1$ to 14 and $R_1$ to $R_3$ is hydrogen, $C_1$-$C_6$ alkyl, $C_3$-$C_6$ cycloalkyl or $C_6$-$C_9$ aryl,
   wherein the copolymer is free of iodine or bromine groups.

2. A copolymer according to claim 1, wherein (a) comprises at least one of vinylidene fluoride, tetrafluoroethylene, chlorotrifluoroethylene and vinyl fluoride and (b) comprises at least one fluorine-containing ethylene other than a fluorine-containing $C_{3-8}$ alkene.

3. A copolymer according to claim 1, wherein (a) plus (b) comprises at least one member selected from the group consisting of vinylidene fluoride/hexafluoropropene, vinylidene fluoride/tetrafluoroethylene/hexafluoropropene, tetrafluoroethylene/vinylidene fluoride/perfluoroalkyl perfluorovinyl ether, tetrafluoroethylene/propene, tetrafluoroethylene/vinylidenefluoride/hexafluoropropene/pentafluoropropene, tetrafluoroethylene/vinylidene fluoride/hexafluoropropene/perfluoroalkyl perfluorovinyl ether, tetrafluoroethylene/hexafluoropropene/hexafluoroisobutylene and vinylidene fluoride/chlorotrifluoroethylene/hexafluoropropene.

4. A copolymer according to claim 1, comprising about 5 to 45 mol-% of comonomers of component (b).

5. A copolymer according to claim 1, comprising about 45 to 55 mol-% of comonomers of component (a), 44.9 to 54.9 mol-% of comonomers of component (b) and 0.1 to 5 mol-% of comonomers of component (c).

6. A copolymer according to claim 1, comprising about 47.9 to 51.9 mol-% of comonomers of component (a), 47.9 to 51.9 mol-% of comonomers of component (b) and 0.2 to 2.5 mol-% of comonomers of component (c).

* * * * *